United States Patent [19]

Kassai

[11] 4,191,397

[45] Mar. 4, 1980

[54] BABY CARRIAGE

[75] Inventor: Kenzo Kassai, Osaka, Japan

[73] Assignee: Kassai Kabushikikaisha, Osaka, Japan

[21] Appl. No.: 903,016

[22] Filed: May 4, 1978

[30] Foreign Application Priority Data

Jun. 15, 1977 [JP] Japan .................................. 52/71460
Dec. 22, 1977 [JP] Japan ................................ 52/155189
Jan. 7, 1978 [JP] Japan ................................. 53/596[U]
Jan. 27, 1978 [JP] Japan ..................................... 53/8443

[51] Int. Cl.² ............................................. B62B 11/00
[52] U.S. Cl. .................................... 280/647; 280/650
[58] Field of Search ................. 280/47.36, 47.37, 650, 280/647, 648, 649, 642, 644; 188/2 D, 20

[56] References Cited

U.S. PATENT DOCUMENTS 3,669,463   6/1972   Boudreau ........................... 280/47.37

FOREIGN PATENT DOCUMENTS 169326   9/1921   United Kingdom .................. 280/47.36

*Primary Examiner*—Robert R. Song
*Attorney, Agent, or Firm*—W. G. Fasse; D. F. Gould

[57] ABSTRACT

The present baby stroller may be collapsed to assume an elongated substantially flat form. The stroller has a push member which can be pivoted to selectively assume a back fronting push position or a face fronting push position with respect to the baby sitting in the stroller or carriage.

12 Claims, 17 Drawing Figures

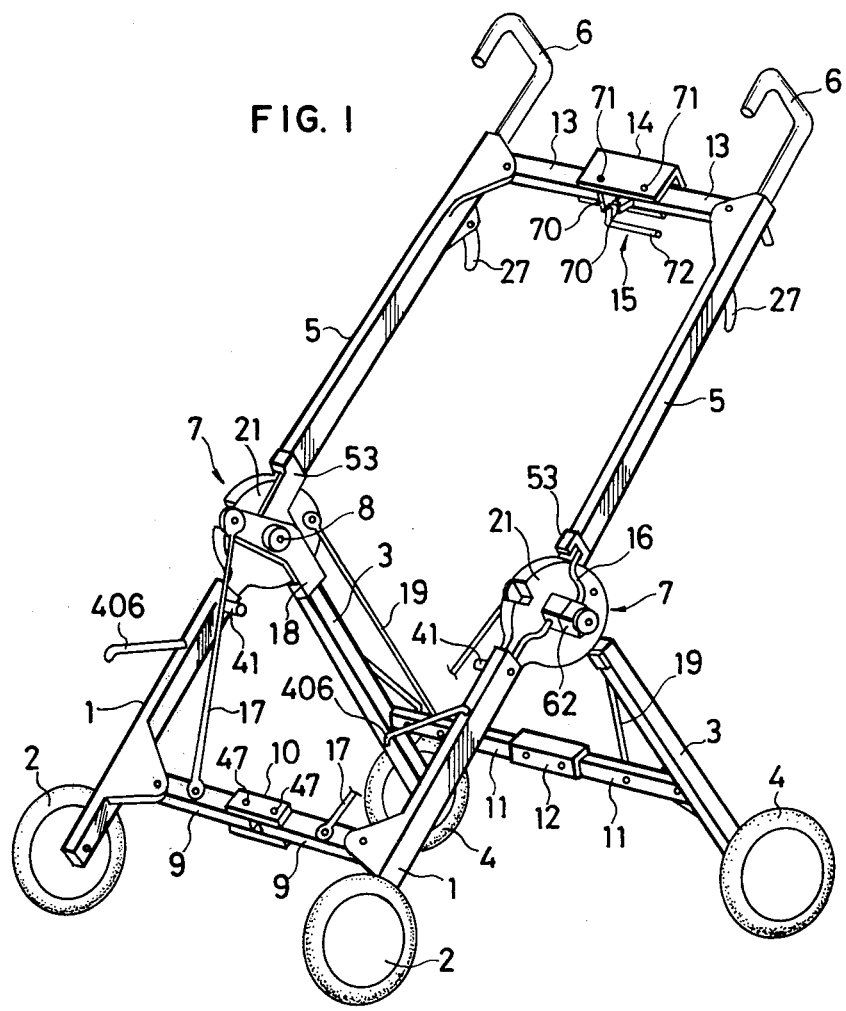
FIG. I

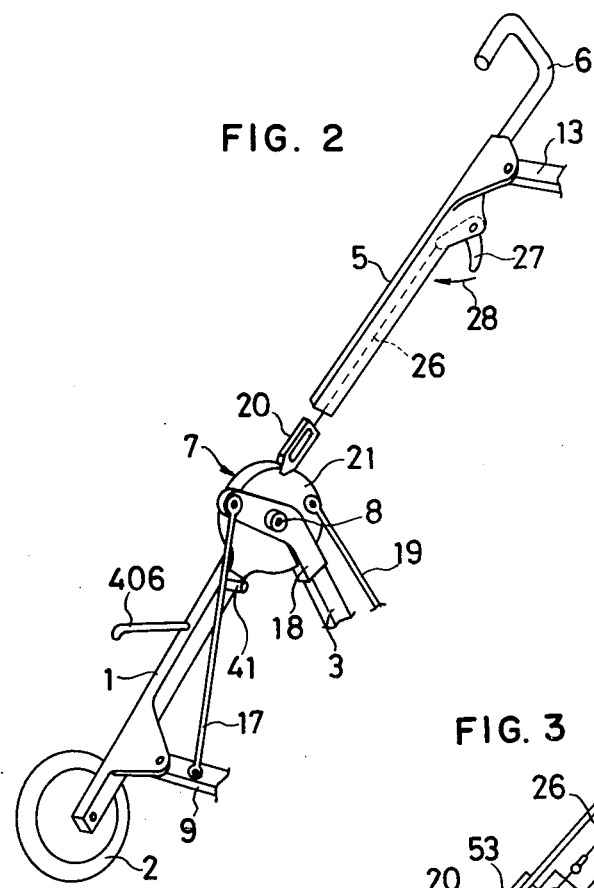
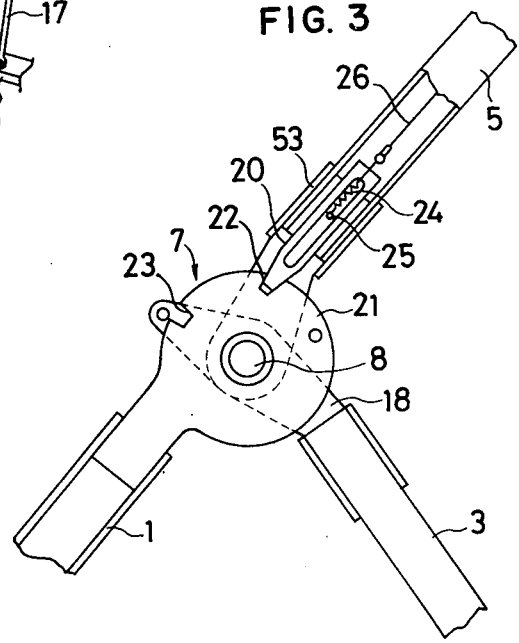

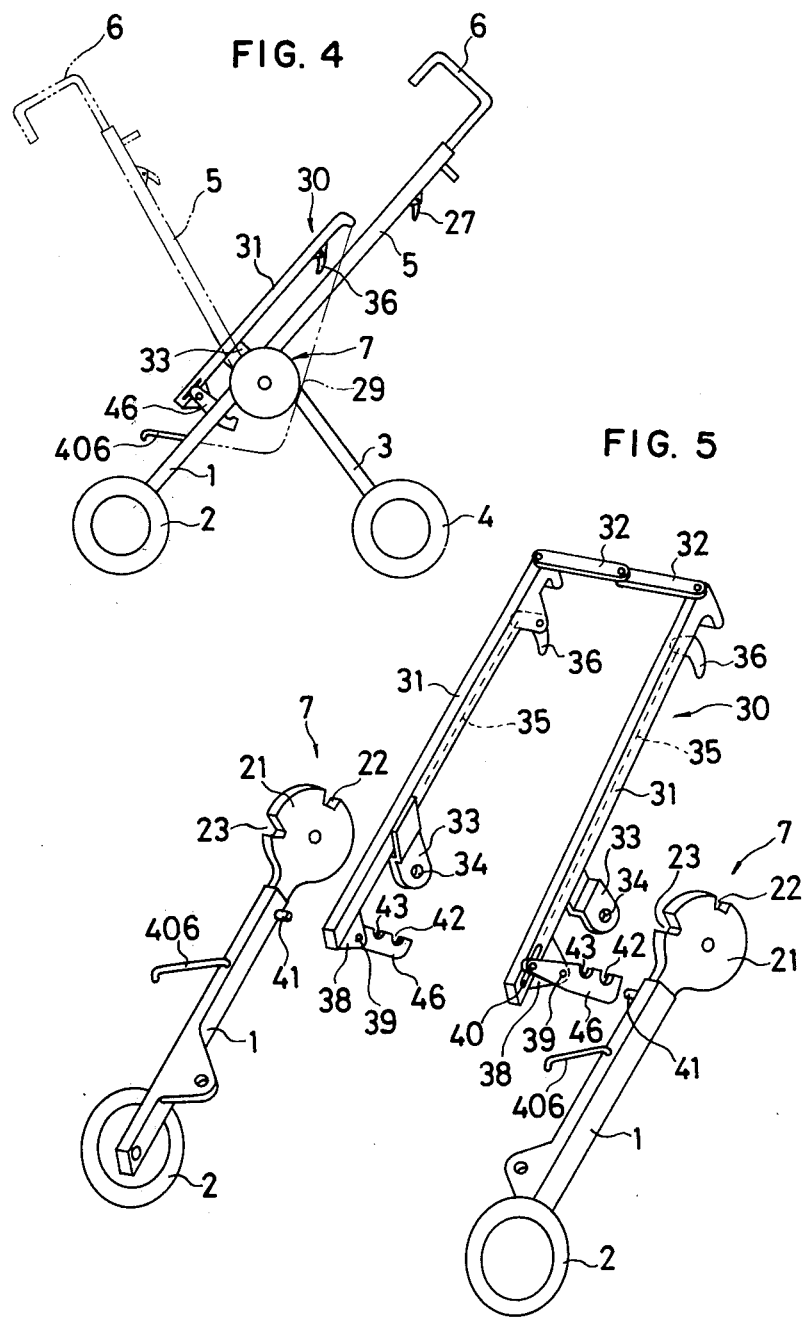

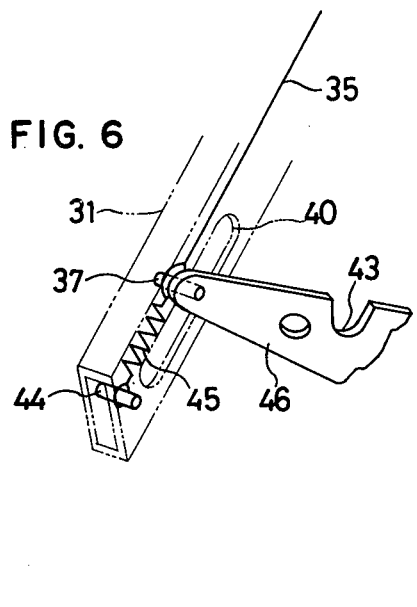
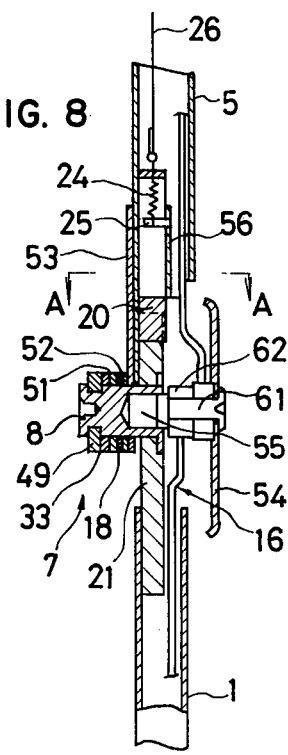
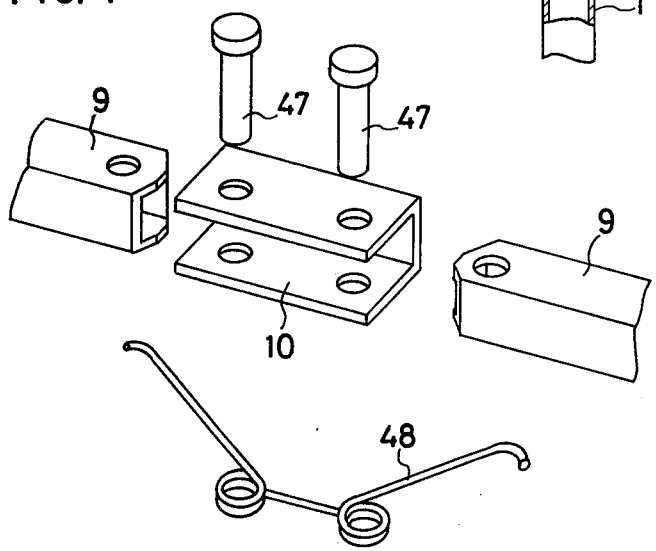

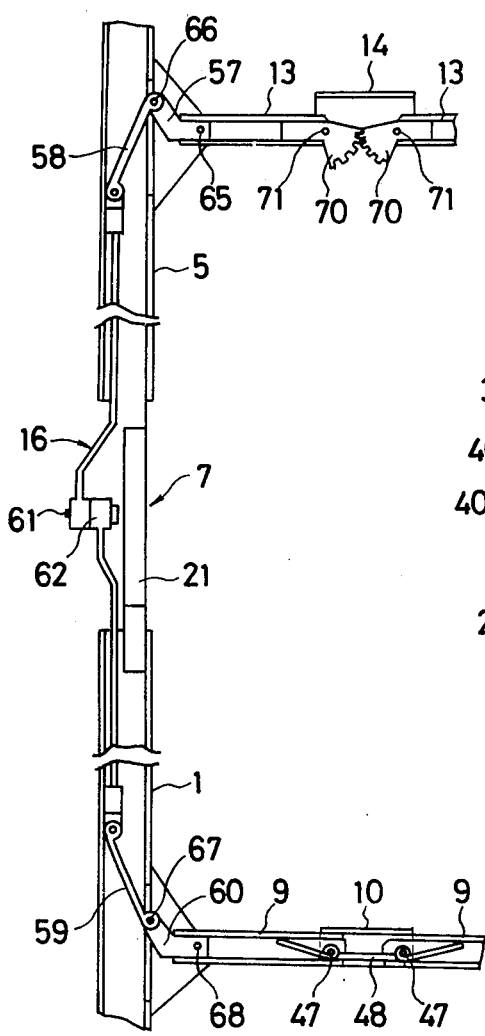
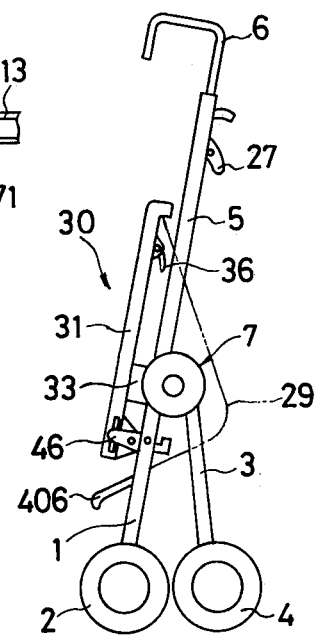
FIG. 12
FIG. 14

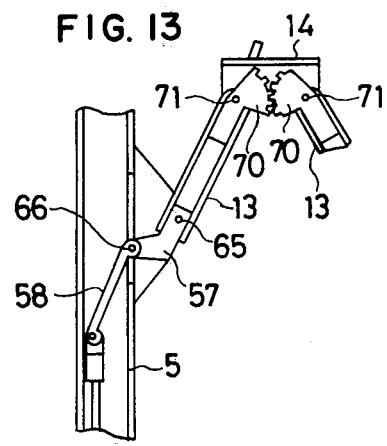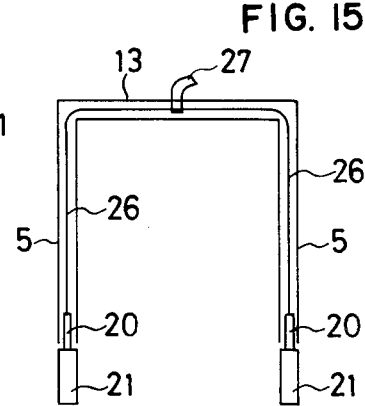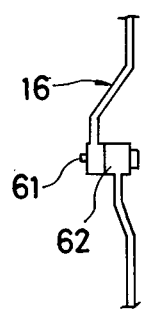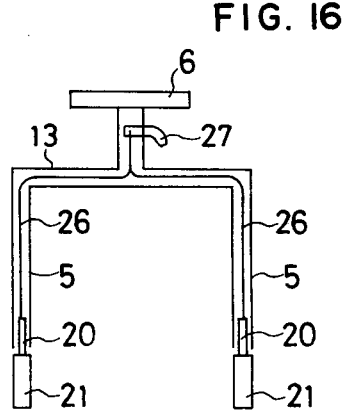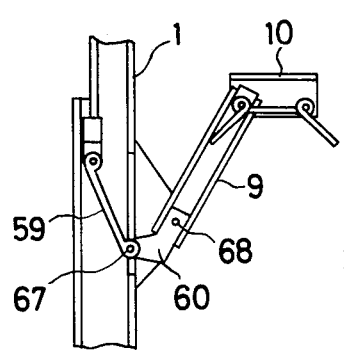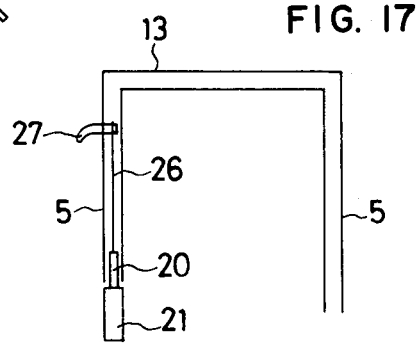

BABY CARRIAGE

BACKGROUND OF THE INVENTION

This invention relates to a baby carriage and more particularly it relates to a stroller type baby carriage arranged so that it can be selectively set for a face-fronting push mode and a back-fronting push mode. The terms "stroller" and "baby carriage" are used interchangeably herein.

Heretofore, there have been two types of strollers, the back-fronting push type in which the person who pushes the carriage is facing the back of the baby in the stroller, and the face-fronting push type in which the person who pushes the carriage views the face of the baby. The selection of one or the other of these types depends on taste and on safety. Usually, the face-fronting push type is used for younger babies and the back-fronting push type for older babies.

It would be more convenient if the selection of the back-fronting push mode or face-fronting push mode could be made on a single baby carriage. Therefore, baby carriages constructed to be capable of selectively providing these two modes have been proposed.

However, it is required that the baby carriage be light in weight and simple in construction. Further, it is also an important requirement that the carriage or stroller has sufficient strength and durability. Therefore, it would be important to incorporate a mechanism which selectively provides the back-fronting push mode and the face-fronting push mode while satisfying these requirements.

On the other hand, the collapsible baby carriage is very convenient in connection with the use of transport facilities and has been widely used. In such collapsible baby carriage, the incorporation of a mechanism for providing collapsibility while satisfying said requirements including simple construction would encounter difficulties in design. Under these circumstances, the addition of a mechanism for selectively providing the back-fronting and face-fronting push modes would cause inconveniences including more complicated construction.

SUMMARY OF THE INVENTION

From the foregoing description, it will be understood that a mechanism for selectively providing the back-fronting and face-fronting push modes to be incorporated in a baby carriage should satisfy the requirement that the arrangement be simple and, nevertheless, be capable of securely achieving one or the other of said modes as desired. This invention satisfies such requirement or desire.

In brief, the invention relates to a baby carriage or stroller provided with a push member which is pivotally mounted by laterally directed pivots through the intermediary of pivotal mounts disposed on opposite sides of a hammock for resting a baby therein and which has a grip or handle means for manual push. Thus, said pushing member is pivotally mounted by said pivotal mounts. At least one of said two pivotal mounts includes a fixedly disposed stop plate having a circumferential surface with its center at the axis of said pivotal mount. The outward circumferential surface of said stop plate has at least two notches formed therein at different positions. On the other hand, the push member is provided with a wedge-like members movable toward and away from the stop plate and engageable with said notches. Therefore, the selective engagement of said movable wedge-like member with either of the at least two notches of the stop plate enables the push member to be fixed in either of two positions, one in which it is tilted at least to the front of the hammock (the face-fronting push position) and the other in which it is tilted to the back of the hammock (the back-fronting push position). In a more preferred embodiment of the invention, the wedge-like member is urged toward the stop plate by a suitable spring member and its advance and retraction are controlled by a suitable operating lever through a wire. Another preferred embodiment of the invention is directed to a collapsible baby carriage wherein front and rear legs and push rods, disposed on the right-hand and left-hand sides of the hammock, are pivotally mounted through said pivotal mounts and a plurality of foldable connecting links are installed between such pairs of front and rear legs and between push rods, the arrangement being such that in the leg-opened position of said collapsible baby carriage, the push rods may be turned around the axes of the pivotal mounts to selectively provide the back-fronting push mode or face-fronting push mode.

Accordingly, a principal object of this invention is to provide a baby carriage arranged so that the selection of said two modes can be made by a simpler yet reliable arrangement.

Another object of the invention is to provide a mechanism for selection of the back-fronting push mode or face-fronting push mode which can be advantageously applied to a collapsible baby carriage without interfering with the collapsing operation.

BRIEF DESCRIPTION OF THE DRAWINGS

FIG. 1 is a perspective view of an embodiment of this invention shown in its leg-opened state;

FIG. 2 is a partial perspective view, showing the leg-opened state, and illustrating an arrangement capable of selectively providing the back-fronting push mode or the face-fronting push mode;

FIG. 3 is a side view of an arrangement associated with a pivotal mount;

FIG. 4 is a complete side view;

FIG. 5 is an exploded perspective view of a hammock retaining frame and front legs;

FIG. 6 is a partial perspective view showing a pivotally mounted hammock reclining member;

FIG. 7 is an exploded perspective view for illustrating the front leg folding connecting link arrangement;

FIG. 8 is a longitudinal section showing the arrangement of a pivotal mount and related parts;

FIG. 12 is a longitudinal section showing a connecting mechanism extending from a push member connecting link to a front leg connecting link;

FIG. 13 is a longitudinal section showing a state different from that shown in FIG. 12;

FIG. 14 is a side view showing a leg-closed state; and

FIGS. 15 through 17 are schematic views of principal portions illustrating other embodiments of the invention.

DESCRIPTION OF THE PREFERRED EMBODIMENTS

Figure 9:
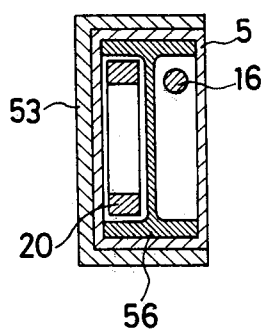
FIG. 9 is a section taken along the line A—A of FIG. 8.

FIG. 1 is a perspective view showing the leg-opened state of a collapsible baby carriage according to the invention In addition, in FIG. 1, the arrangement associated with the hammock for resting a baby therein is omitted. The outline of the framework of this collapsible baby carriage will be described with reference to FIG. 1. Front legs 1 formed of pipes have front wheels 2 mounted to their lower ends, and rear legs 3 have rear wheels 4 mounted to their lower ends. Push rods 5 formed of pipes have bent handles 6 provided at their upper ends. Pivotal mounts 7 are fixed to the front legs 1 and pivotally support the rear legs 3 and push rods 5 by pivot pins 8 at respective pivotal points. Front leg connecting links 9 are installed between the front legs 1 and connected together by a front coupling 10 of U-shaped cross-section so that they can be upwardly folded in two. Rear leg connecting links 11 are installed between the rear legs 3 and connected together by a rear coupling 12 of U-shaped cross-section so that they can be upwardly folded in two. Push rod connecting links 13 are installed between the push rods 5 and connected together by an upper coupling 14 of U-shaped cross-section so that they can be upwardly folded in two. An operating handle 15 associated with said upper coupling 14 serves to upwardly fold the push rod connecting links 13 in two when it is upwardly pulled, as will be later described.

The operation will be outlined with reference to FIG. 1. When the push rod connecting links 13 are folded in two by upwardly pulling the operating handle 15, the front leg connecting links 9 will be upwardly folded in two. This motion is achieved by a link mechanism including first rods 16 extending through and substantially hiden by the push rods 5 and front legs 1, as will be later described. When the front leg connecting rods 9 are upwardly folded in two, as described above, second rods 17 upwardly push rear leg couplings 18, acting to reduce the angles the rear legs 3 form with the associated front legs 1. At the same time, the distance between the pair of push rods 5 and the distance between the front legs 1 are reduced. In operative association with these actions, third rods pivotally supported at one of their respective ends on the push rod side of the pivotal mounts 7 and at the other ends on the rear leg connecting links 11 guide the rear leg connecting links 11 so as to upwardly fold them in two. Thus, along with said rear leg connecting links 11, the front leg connecting links 9 and push rod connecting links 13 are respectively upwardly folded in two in an elongated form. At the same time, the rear legs 3 approach the front legs 1. This state is shown in a side view in FIG. 14.

This baby carriage, in its leg-opened state shown in FIG. 1, can be manipulated to tilt the push rods 5 toward the front legs. This will now be described with reference to FIG. 1 and to FIGS. 2 through 4. FIG. 2 is a partly omitted perspective view showing the leg-opened state for explanation of an arrangement capable of selectively providing the back-fronting and face-fronting push modes; FIG. 3 is a side view of an arrangement associated with the pivotal mount; and FIG. 4 is a complete side view of the baby carriage.

Referring to FIGS. 1 through 4, a wedge-like member 20 is adapted to engage a first notch 22 or a second notch 23 in the stop plate 21 of the associated pivotal mount 7. A spring 24 is installed between a fixed pin 25 disposed inside the push rod 5 and the upper end of the wedge-like member 20, urging the wedge-like member downwardly for engagement with the first and second notches 22 and 23. A wire 26 is connected at one end thereof to the wedge-like member 20 and at the other end to an operating lever 27. The operating lever 27 is pivotally mounted on the back of the push rod 5, and when manipulated in the direction of arrow 28, it pulls up the wedge-like member 20 through the wire 26 to destroy the engagement between the wedge-like member 20 and the first or second notch 22 or 23 of the stop plate 21, thereby permitting the push rod 5 to be turned with respect to the front leg 1. Therefore, as shown in FIG. 4, when the push rods 5 are forwardly turned and then the operating levers 27 are released, the wedge-like members 20 engage the second notches 23, whereby such state is fixed, realizing the face-fronting push mode.

In FIG. 4, a hammock 29 is shown in phantom lines. An arrangement related to a support frame 30 for said hammock will first be described with reference to FIGS. 5 and 6.

FIG. 5 is an exploded perspective view of the hammock support frame and front legs, and FIG. 6 is a partly omitted perspective view showing how a hammock reclining member is pivotally mounted. The hammock supporting frame 30 comprises side links 31 and foldable-in-two back-rest connecting links 32 interposed between the upper ends of said links 31. Secured to relatively lower regions of the side links 31 are support frame pivotal mounts 33 having openings 34 for receiving the previously mentioned pivot pins 8 for the pivotal mounts 8, said hammock support frame 30 being pivotally supported with respect to the front legs 3 similarly to the push rods 5 and rear legs 3.

A wire 35 is passed through the associated side link 31 and is connected at one end thereof to an operating lever 36 pivotally mounted on the back of the side link 31, the other end of said wire being connected to a pin 37 fixed to one end of a reclining member 46. The reclining member 46 is pivotally supported by a pivot pin 39 on a attaching plate 38 secured to the lower end of the side link 31. The side link 31 is formed at its lower end with a longitudinal opening 40 which permits the pin 37 to be moved as the reclining member 46 is turned. The reclining member 46 has two engaging recesses 42 and 43 for engagement with an engaging pin 41 disposed on the inner side of the front leg 1 and is urged in a counterclockwise direction by a spring 45 installed between the pin 37 and a pin 44 disposed inside the side link 31. Therefore, the engaging pin 41 is capable of engaging either of the engaging recesses 43 and 43 to hold the hammock support frame 30 in its normal position or in its reclining position. Sheet rods 406 forwardly extending from the front legs 1 are provided so that the sheet constituting the hammock 29 may be wrapped around them, said sheet being also wrapped around the hammock support frame 30, whereby a hammock in a desired form is obtained.

FIG. 7 is an exploded perspective view for explanation of coupled state between, e.g., a front leg connecting link and a front coupling. The front leg connecting links 9 and the front coupling 10 are to be pivotally connected together by pins 47. A spring 48 will be fitted on the pins 47, with the ends of said spring abutting against the inner surfaces of the front leg connecting links 9. Therefore, the spring 48 acts to maintain the front leg connecting links in a straight form. In addition, such arrangement is also applied to the junction between the rear leg connecting links 11 and rear coupling 12.

Figure 10:
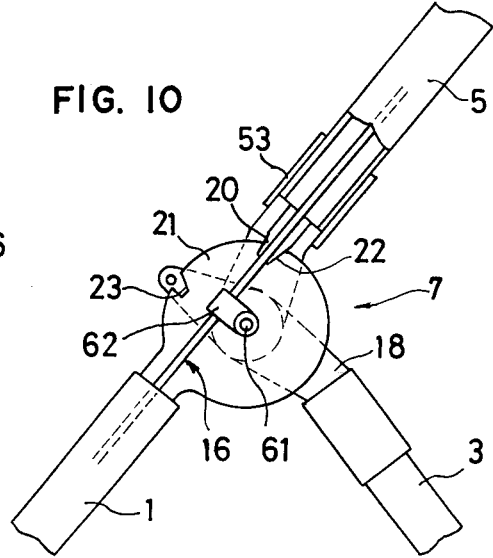
FIG. 10 is a side view, partly broken away, showing the arrangement of the pivotal mount and related parts.
Figure 11:
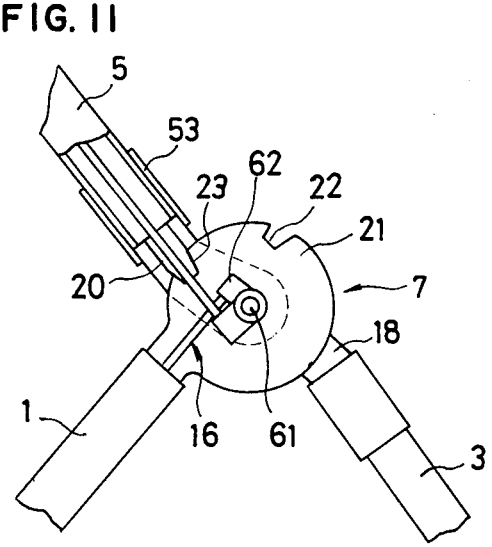
FIG. 11 is a side view, partly broken away, showing a state different from that shown in FIG. 10.

The arrangement for collapsing operation will now be described. FIG. 8 is a longitudinal section showing the arrangement around the pivotal mount, and FIG. 9 is a section taken along the line A—A of FIG. 8. FIG. 10 is a side view, partly broken away, of the arrangement around the pivotal mount. FIG. 11 is a side view, partly broken away, showing a state different from that shown in FIG. 10. FIG. 12 is a longitudinal section of an interlocking mechanism extending from the push rod connecting links to the front leg connecting links, and FIG. 13 is a longitudinal section showing a state different from that shown in FIG. 12.

Before describing the arrangement related to collapsing operation, the positional relation of the elements described so far will first be described with reference to FIGS. 8 and 9. Fitted on the pivot pin 8, there are disposed a washer 49, the support frame pivotal mount 33 for pivotally mounting the hammock support frame 30, a spacer 51, the rear leg coupling 18, a spacer 52, a push rod coupling 53 and the stop plate 21, and a pin 55 for holding a cover 54 is installed in said pivot pin 8. The wedge-like member 20 is adapted to slide along a guide 56, and said fixed pin 25 extends from said guide 56.

The arrangement related to the collapsing operation will be described with reference to FIGS. 8 through 13. Disposed outwardly of a pivot point 65 on the push rod connecting link 13 with respect to the push rod 5 is a lever 57 adapted to be turned together with the push rod connecting link 13. The lever 57 has a shape upwardly bent with respect to the push rod connecting link 13. One end of a connecting rod 58 is pivotally connected to the front end of the lever 57 at a pivot point 58, while the other end of said connecting rod 58 being pivotally connected to the first rod 16. The first rod 16 extends inside the tubular push rod 5 and is bent in the vicinity of the stop plate 21 to clear the latter. The first rod 16 then extends inside the tubular front leg 1 and is pivotally connected at its lower end to one end of a connecting rod 59. The other end of the connecting rod 59 is pivotally connected to the front end of a lever 60 at a pivot point 67. The lever 60 has a shape similar to that of the lever 57 and is disposed at the end of said front leg connecting link 9 and adapted to be turned together with said front leg connecting link 9 around a pivot point 68. In addition, a foldable portion 62 pivotally supported by a pin 61 is formed intermediate between the ends of the first rod 16.

FIGS. 10 and 11 show states where the push rods 5 have attained the back-fronting and face-fronting push modes, respectively, as already described. In order to attain said two modes, it is necessary to change the angle between the front leg 1 and the push rod 5. To this end, it is necessary for the first rod 16 to have the foldable portion 62. In the case of FIG. 11, for example, it will be understood that the first rod 16 is folded in two at the foldable portion 62 so that it does not interfere with the turning of the push rod 5. Also, in the state shown in FIG. 10, the first rod 16 becomes straight, permitting the thrust to be advantageously transmitted through the first rod 16.

As best shown in FIGS. 12 and 13, the joint between the push rod connecting links 13 and the upper coupling 14 has an arrangement different from that of the joint between the front leg connecting links 9 and the front coupling 10. More specifically, the ends of the push rod connecting links 13 interconnected by the upper coupling 14 are provided with gears 70. Each gear 70 is in the form of a sector which is peripherally formed with teeth, having a necessary minimum shape to achieve an operation to be presently described, said shape contributing to rendering this part compact. The gear 70 is fixedly installed by being fitted in the associated push rod connecting link 13, and is pivotally connected to the upper coupling 14 by a shaft 71 extending transversely therethrough. One of the two shafts 71 is fixed to the associated gear 70 so that it can be turned integrally with the latter, said one shaft 71 projecting through the upper coupling 14 to appear at one side thereof, where an operating handle 15 is formed. The operating handle 15 includes a lever portion 72 extending at right angles with the axis of the shaft 71.

In such arrangement the upward folding of the push rod connecting links 13 is achieved in a state where the gears 70 are meshing with each other. More specifically, with the gears 70 meshing with each other all the way from the state shown in FIG. 12 to the state shown in FIG. 13, the push rod connecting links 13 are upwardly folded in two.

In operative association with said upward folding of the push rod connecting links 13, the levers 57, connecting rods 58, first rods 16, connecting rods 59 and levers 60 are actuated as desired, so that the front leg connecting links 9 are also upwardly folded in two.

The opening and closing operations of this collapsible baby carriage will now be described.

For example, in the leg-opened state shown in FIG. 1, the front leg connecting links 9, rear leg connecting links 11 and push rod connecting links 13 are disposed straight between the front legs 1, rear legs 3 and push rods 5, respectively. Further, as shown in FIG. 2, 3 or 10, the wedge-like members 20 are engaged with the notches 22 of the stop plates 21, providing the back-fronting push mode. The rear leg connecting links 11 are in the opened state under their own weight with respect to the front legs 1, the upper limit of such opening being defined in that they are propped by the second rods 17.

In order to change such leg-opened state to the leg-closed state, the lever portion 72 of the operating handle 15 is manually gripped and raised to allow the baby carriage to hang downwardly, whereupon the weight of the baby carriage acts to produce a force which positively turns one gear 70 in a counterclockwise direction as viewed in the illustration, so that the other gear 70 meshing therewith is forced to turn clockwise. This movement acts to upwardly fold the push rod connecting links 13, forcing the latter into the state shown in FIG. 13. This operation causes the front leg connecting links 9 to be upwardly folded through the first rods 16, etc. In response thereto, the second rods 17 act to move the rear legs 3 toward the front legs 1 and simultaneously therewith the third rods 19 act to upwardly fold the rear leg connecting links 11. Therefore, ultimately, the front legs 1, the rear legs 3 and push rods 5 respectively approach each other and the rear legs approach the front legs 1, thereby establishing an elongated collapsed state. This state is shown in FIG. 14.

When it is desired to make a change from the leg-closed state to the leg-opened state, this may be achieved by manually turning the lever portion 72 clockwise as viewed in the illustration, i.e., counterclockwise as viewed from the operating side, whereby with the gears 70 meshing with each other the push rod connecting links 13 are actuated to come into line, so that, as in the preceding case, the link mechanism including the first rods 16 brings the baby carriage into the leg-opened state.

According to this embodiment, the turning of the operating handle 15 controls the turning of one of the gears 70 meshing with each other, said gears 70 being interlocked with the push rod connecting links 13 so that the latter are symmetrically folded. Therefore, by manually turning the operating handle 15 by gripping the lever portion 72, it is possible to smoothly effect the opening and closing of the baby carriage. Further, since the push rod connecting links 13 are arranged so that they can be upwardly folded, the raising of the lever portion 72 extending at right angles with the axis of the shaft 71 of one gear 70 so as to hang the baby carriage downwardly causes the weight of the baby carriage to act to immediately bring the baby carriage into the leg-closed state.

The invention has so far been described with reference to a case where it is applied to a baby carriage which can be collapsed into an elongated form. However, it is not limited thereto and it is also applicable to other types of collapsible baby carriages and to uncollapsible baby carriages. This will now be described below.

FIG. 15 is a schematic view of the principal portion of another embodiment of the invention. In addition, in FIG. 15 and in FIGS. 16 and 17 to be later described, the parts corresponding to those in FIGS. 1 through 14 are given like reference numerals.

Referring to FIG. 15, the push rods 5 are intergal with the push rod connecting link 13, the latter also serving as a grip for manual push. Therefore, while the push rods 5, push rod connecting links 13 and upper coupling 14 have constituted a push member in the preceding embodiment, push rods 5 and a push rod connecting link 13 integral therewith constitute a push member in this embodiment. This embodiment is characterized in that it is arranged so that the two wires 26 connected to the two wedge-like members 20 adapted to engage the two stop plates 21 are pulled by an operating handle 27. In addition, it is to be pointed out that this embodiment is also applicable to the above described collapsible baby carriage which can be collapsed in an elongated form.

FIG. 16 is a schematic view of the principal portion of another embodiment of the invention. The push member shown therein is composed of push rods 5 and a push rod connecting link 13 integral therewith and a handle 6 extending from the push rod connecting link 13. In this embodiment also, the wires 26 connected to the two wedge-like members 20 adapted to engage the two stop plates 21 are operated by a single operating handle 27. In addition, the operating handle 27 is provided at a portion extending from the push rod connecting link 13 to the handle 6.

FIG. 17 is a schematic view of the principal portion of a further embodiment of the invention. The push member shown therein comprises push rods 5 and a push rod connecting link 13 integral therewith, as in the case of the preceding embodiment. The difference from the embodiment shown in FIG. 15 is that the stop plate 21 is provided only on one side and that, therefore, there are a single wedge-like member 20 and wire 26, associated with the stop member 26, there being an operating handle 27 disposed on one side associated with the stop plate 21. According to this embodiment, it is seen that the provision of at least a set comprising a stop plate and a wedge-like member is sufficient for fixing the push member at desired positions.

Although the present invention has been described and illustrated in detail, it is to be clearly understood that the same is by way of illustration and example only and is not to be taken by way of limitation, the spirit and scope of the present invention being limited only by the terms of the appended claims.

What is claimed is:

1. A collapsible baby stroller, comprising frame means, hammock means operatively held in said frame means for resting a baby in said hammock means, said frame means comprising first and second leg means and push means, said frame means further comprising pivotal mounting means having a pivot axis, said pivotal mounting means being disposed on opposite sides of said hammock means, said pivotal mounting means operatively pivotally interconnecting said first and second leg means and said push means, at least one of said pivotal mounting means including fixed stop plate means having a circumferential surface with its center at said pivot axis, said circumferential surface of said stop plate means having at least two notches at different positions thereon; said stroller further comprising a wedge-like member operatively supported by said push means and movable toward and away from said stop plate means; whereby the selective engagement of said movable wedge-like member with either of said at least two notches enables said push means to be alternately fixed in two positions so that said push means are tilted forwardly of said hammock means in one of said two positions and rearwardly of said hammock means in the other of said two positions.

2. The baby stroller of claim 1, which further comprises operating means for said wedge-like member, a spring member coupled to said wedge-like member and to said operating means, whereby said wedge-like member is urged toward said stop plate by said spring member.

3. The baby stroller of claim 2, wherein said operating means comprises a wire having one end thereof coupled to said wedge-like member, and an operating lever member for pulling said wire, so that pulling said wire by means of said operating lever member causes said wedge-like member to be disengaged from said notches against the force of said spring member.

4. The baby stroller of claim 3, wherein said push means comprise two rods extending substantially vertically from said pivotal mounting means, and a horizontal rod, said two rods having upper ends interconnected by said horizontal rod.

5. The baby stroller of claim 4, wherein said wire extends inside said two rods, and wherein said lever member comprises an operating handle projecting from said rods for pulling said wire.

6. The baby stroller of claim 4, wherein said stop plate means, said wedge-like member, said spring member and said wire are provided on each of opposite sides of said hammock means, and wherein said wires extend inside said push means.

7. The baby stroller of claim 6, wherein said operating lever member comprises an operating handle projecting from said push means for pulling said wires.

8. The baby stroller of claim 7, wherein one operating handle is provided for each wire.

9. The baby stroller of claim 7, wherein the ends of said wires are connected together, and the two wires are simultaneously pulled by said operating handle.

10. The baby stroller of claim 1, wherein said push means comprise a pair of push bars and wherein said first and second leg means each comprise a pair of legs, said frame means further comprising a set of link bars foldably and operatively coupled to each of said pairs of legs and to said push bars.

11. The baby stroller of claim 10, wherein said pairs of first and second legs, said push bars and said set of link bars constitute said frame means, whereby in the leg closing operation, the folding of one set of link bars causes the folding of the other connecting link bars, whereby the distances between said legs, and push bars is decreased and wherein during the leg opening operation, the straightening of one set of link bars causes the straightening of the other sets of link bars, resulting in the increase of the respective distances between said legs, and push bars.

12. The baby of claim 1, wherein said pivotal mounting means are fixed to one of said leg means.

* * * * *

UNITED STATES PATENT AND TRADEMARK OFFICE
CERTIFICATE OF CORRECTION

PATENT NO. : 4,191,397
DATED : March 4, 1980
INVENTOR(S) : Kenzo Kassai

It is certified that error appears in the above—identified patent and that said Letters Patent is hereby corrected as shown below:

Claim 12, line 1, after "baby" insert -- stroller --.

Signed and Sealed this

Eighth Day of July 1980

[SEAL]

Attest:

SIDNEY A. DIAMOND

Attesting Officer

Commissioner of Patents and Trademarks